United States Patent
Chandhoke

(10) Patent No.: US 7,565,654 B2
(45) Date of Patent: *Jul. 21, 2009

(54) PROGRAMMATIC CONTROL OF TASKS IN A PROGRAMMABLE LOGIC CONTROLLER

(75) Inventor: Sundeep Chandhoke, Austin, TX (US)

(73) Assignee: National Instruments Corporation, Austin, TX (US)

( * ) Notice: Subject to any disclaimer, the term of this patent is extended or adjusted under 35 U.S.C. 154(b) by 508 days.

This patent is subject to a terminal disclaimer.

(21) Appl. No.: 11/329,788

(22) Filed: Jan. 10, 2006

(65) Prior Publication Data

US 2007/0162906 A1    Jul. 12, 2007

(51) Int. Cl.
     *G06F 9/46*      (2006.01)
     *G06F 3/048*     (2006.01)
     *G05B 11/01*     (2006.01)
     *G05B 19/42*     (2006.01)

(52) U.S. Cl. .................. 718/103; 718/104; 700/23; 700/86; 715/771

(58) Field of Classification Search .......... 718/100, 718/102–107; 715/700, 764, 771, 772; 712/214, 712/245; 710/58, 59, 260, 266; 700/2, 11, 700/12, 14, 17, 32, 96, 108, 86, 23
See application file for complete search history.

(56) References Cited

U.S. PATENT DOCUMENTS

| | | | | |
|---|---|---|---|---|
| 4,486,830 A | * | 12/1984 | Taylor et al. ................... | 700/17 |
| 5,481,741 A | | 1/1996 | McKaskle et al. | |
| 5,486,998 A | * | 1/1996 | Corso .......................... | 700/32 |
| 5,538,423 A | * | 7/1996 | Coss et al. .................... | 433/27 |
| 5,633,806 A | * | 5/1997 | Yusa et al. ..................... | 716/16 |
| 5,657,441 A | * | 8/1997 | Kurose et al. ................. | 714/28 |
| 5,713,036 A | * | 1/1998 | Kamiguchi et al. .......... | 700/108 |
| 5,765,000 A | | 6/1998 | Mitchell et al. | |
| 5,867,383 A | * | 2/1999 | Jansen ......................... | 700/17 |
| 5,940,628 A | * | 8/1999 | Seno ............................ | 710/59 |
| 6,108,775 A | * | 8/2000 | Shiell et al. ................. | 712/240 |

(Continued)

FOREIGN PATENT DOCUMENTS

JP      07210403 A   *   8/1995

(Continued)

*Primary Examiner*—Crystal J Barnes Bullock
(74) *Attorney, Agent, or Firm*—Meyertons Hood Kivlin Kowert & Goetzel, P.C.; Jeffrey C. Hood; Mark S. Williams

(57) ABSTRACT

System and method for modifying properties of tasks on a programmable logic controller. Input specifying modification of a property of a task included in a programmable logic controller (PLC) may be received. The property of the task may be modified based on the input, and the task may halt or continue to execute in accordance with the modified property. The modification may enable, disable, modify the rate of, modify the priority of, and/or modify properties of programs included in the task, among others. Modifying the programs may include changing the program execution order. When enabling or disabling the task, the input may be received from another task executing on the PLC. For at least some property modifications, the input may be received from one or more of a program included in the task, another executing task, a host computer system, and a user of the host computer system, among others.

28 Claims, 11 Drawing Sheets

U.S. PATENT DOCUMENTS

| | | | |
|---|---|---|---|
| 6,668,205 B1 * | 12/2003 | Ueno | 700/96 |
| 6,853,867 B1 | 2/2005 | Klindt et al. | |
| 6,880,029 B2 * | 4/2005 | Tomita | 710/260 |
| 6,993,765 B2 * | 1/2006 | Suzuki et al. | 718/102 |
| 7,003,733 B2 | 2/2006 | Duemler | |
| 7,058,693 B1 | 6/2006 | Baker, Jr. | |
| 7,062,335 B2 | 6/2006 | Klindt et al. | |
| 7,168,075 B1 * | 1/2007 | Barthel et al. | 718/103 |
| 7,191,087 B2 * | 3/2007 | Inoue et al. | 702/127 |
| 7,203,931 B2 * | 4/2007 | Minamide et al. | 717/136 |
| 7,272,458 B2 * | 9/2007 | Tomita | 700/87 |
| 7,467,231 B2 * | 12/2008 | Kegoya et al. | 709/246 |
| 2005/0055109 A1 * | 3/2005 | Nagashima et al. | 700/23 |

FOREIGN PATENT DOCUMENTS

| | | | |
|---|---|---|---|
| JP | 10247107 A | * | 9/1998 |
| JP | 11265303 A | * | 9/1999 |
| JP | 2004054622 A | * | 2/2004 |
| JP | 2005301520 A | * | 10/2005 |

* cited by examiner a first task executing on a programmable logic controller (PLC) modifying a property of a second task on the PLC
902 the first task continuing to execute on the PLC
904

PROGRAMMATIC CONTROL OF TASKS IN A PROGRAMMABLE LOGIC CONTROLLER

FIELD OF THE INVENTION

The present invention relates to the field of programmable logic controllers, and more particularly to a system and method for controlling tasks in a programmable logic controller.

DESCRIPTION OF THE RELATED ART

In recent years, programmable logic controllers (PLCs), have become central for controlling relays, motion, distributed resources, networking, and automation, among others. PLCs have become so ubiquitous because of their ability to provide a "generic" solution to a variety of control, measurement, and automation problems. Typically, a PLC includes a processor and a memory and may be coupled to various devices via an input/output. (I/O) interface. A skilled technician may be able to adaptively program the PLC, via user programs, to provide solutions to new problems as they arise rather than having to design and manufacture a new hardware controller. In some cases, the new problems may only require a small modification of the properties of already executing tasks; however, even in cases where the modification is minute, the technician must halt, modify, and recompile the task with the new changes, and deploy the modified task onto the PLC, whereupon the modified task may be executed.

Thus, improved systems and methods for modification of tasks executing on a PLC are desirable.

SUMMARY OF THE INVENTION

Various embodiments of the present invention include a system and method for programmatic control of tasks in a programmable logic controller.

In some embodiments, the method may include receiving input specifying a modification of a property of a task executing on a programmable logic controller. The input specifying a modification may be received by a runtime environment on the PLC, e.g., a controller engine included in the runtime environment. In some embodiments, the modification may be specified by at least one function call, e.g., an application program interface (API) function call.

The property of the task may be any of numerous possible properties. For example, the property may include one or more of a frequency of execution of the task, properties of one or more programs executing within the task, or other suitable properties. When the property of the task relates to the programs included in the task, the input may specify a change of priority, i.e., the execution order, of the programs.

In a multi-tasking environment, the property may include the priority of the task or specifying resource allocation for the task with respect to other tasks executing on the PLC. For example, the input may specify modification of a task such that it has a higher priority than the other tasks due to some stimulus change. In this case, upon receiving the higher priority, the task may preferentially execute its programs over programs of other tasks upon entering an execution cycle. Additionally, the property may include an offset of the task which may specify when the task is executed in relation to the other tasks executing on the PLC, or a clock included in or coupled to the PLC. It should be noted that the property of the task is not limited to those properties described above, and that further properties are envisioned.

When the task includes one or more programs executing within each task execution cycle, the input may be received from at least one program of the one or more programs included in the task. Alternatively, the input may be received from a user. As an example, user input may be received to an application program executing on a host computer system coupled to the PLC, e.g., a human machine interface (HMI) application. The PLC may then receive input from the host computer system based on the user input, such as a change task rate command.

In a multi-tasking environment, the input may be received from another task, i.e., from the other task itself or one or more programs included in the other task, executing on the PLC. For example, a task or one or more programs comprised in the task may specify a modification of a property of another task, e.g., via a modify offset command. In a more specific example where the PLC is used in a process control environment, the PLC may include two tasks. One task, e.g., a "control task", may control a manufacturing line, and the other task, e.g., a "monitoring task", may be a supervisory task, which may monitor the input and output of the manufacturing line and change the operating behavior of the control task. In this example, if the monitoring task detects a decrease in an input, it may specify a modification to slow down the control task by changing the control task's period during execution and in real time, i.e., "on the fly". Using such embodiments, adaptive programs may control the PLC without the necessity of external HMI control.

The property of the task may be modified while the task is executing based on the received input. In other words, the task executing on the PLC may have a property modified without the task being halted (e.g., without being interrupted or stopped). For instance, a task may have been originally executing according to a first frequency of execution and the modification may operate to change the first frequency to a second frequency of execution without stopping the task. Similarly, other properties of the task, such as those enumerated above, among others, may be changed without halting the task, and without having to place the PLC in programming mode.

Following the embodiments above where the modification is specified by the at least one function call, the controller engine may receive the functional call and subsequently change one or more task properties as specified by the functional call. In some embodiments, the runtime environment executing on the PLC, e.g., the controller engine or a timed loop scheduler included in the runtime environment, may modify task properties, such as those enumerated above, and others, stored in the shared memory via a shared memory interface. Note that the runtime environment is not limited to modifying the properties via the shared memory, and may modify the properties via other suitable methods.

The task may continue to execute in accordance with the modified property. Following the example above, when a task is modified from a first frequency of execution to a second frequency of execution, the modification occurs without halting the task, and subsequently, the task may continue to execute at the new, second frequency.

Thus, various embodiments of the present invention may allow modification of properties of a task "on the fly", i.e., during run-time, without halting the task or placing the programmable logic controller into a programming mode.

In some embodiments, a first task executing on a programmable logic controller may modify a property of a second task on the PLC. Similar to the descriptions above, the first task may modify any of a variety of suitable properties, and receive input from a variety of suitable sources. Additionally, if the second task is not executing, the first task may enable the second task, i.e., invoke execution of the second task. Alternatively, if the second task is already executing, the first task may disable the second task.

The first task may continue to execute on the PLC. Additionally, if the first task did not disable the second task, the second task may also continue to execute with the modified property. Alternatively, if the first task disabled the second task, the second task may have been halted, and not allowed to continue to execute on the PLC.

Thus, various embodiments of the present invention may allow a first task to modify of properties of a second task "on the fly", i.e., during run-time, without halting the second task or placing the programmable logic controller into a programming mode.

BRIEF DESCRIPTION OF THE DRAWINGS

A better understanding of the present invention can be obtained when the following detailed description of the preferred embodiment is considered in conjunction with the following drawings, in which.

Figure 1A:
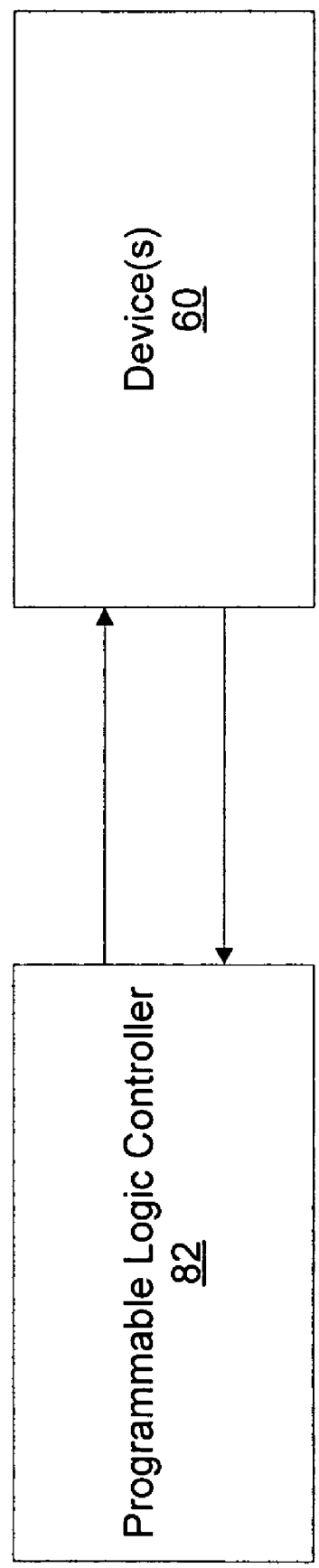
FIG. 1A illustrates a programmable logic controller coupled to one or more devices, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may include two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram includes interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may include only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may include a single window having one or more GUI Elements, or may include a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may include GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements include input controls and output indicators Input Control—a graphical user interface element for providing user input to a program. Exemplary input controls include dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1A—Programmable Logic Controller System

FIG. 1A illustrates a programmable logic controller (PLC) 82 suitable for implementing various embodiments of the present invention. The term "PLC" or "Programmable Logic Controller" is intended to have the full breadth of its ordinary meaning, and at least includes the characteristics described herein.

The programmable logic controller 82 may include a processor as well as a memory medium(s) coupled to the processor on which one or more computer programs or software components may be stored. For example, the memory medium may store one or more programs which are executable to perform the methods described herein. In some embodiments, the programs may include graphical programs. Various embodiments further include receiving or storing instructions and/or data implemented in accordance with the foregoing description upon a carrier medium.

As shown in FIG. 1A, the PLC 82 may be coupled to one or more devices, e.g., device(s) 60. In some embodiments, the devices may be coupled directly to the PLC via an electrical interface. The devices may also be coupled to the PLC via an intermediary device, e.g., another PLC, a programmable hardware element (PHE), a bus, or other suitable devices. In another embodiment, the devices may be implemented at a remote location and may be coupled to the PLC via a network, e.g., LAN, WAN, Internet, Intranet, etc. In this case, an intermediary device may provide a network communication interface between the PLC and the one or more remote devices. In various embodiments, the PLC may communicate with the remote devices using any of a variety of communication protocols, e.g., TCP/IP, Ethernet (e.g., CSMA/CD), Local Talk (e.g., CSMA/CA), Token Ring, FDDI, ATM, NetBEUI, IPX/SPX, IPv6, or other suitable communication protocols.

In some embodiments, the PLC may be included within a chassis. The chassis may include one or more module expansion slots operable to receive expansion modules. The expansion slots may be operable to receive any of a variety of expansion modules, including, PCI, ISA, PXI, VXI, or other suitable form factors and/or card types. The expansion modules may communicate with the PLC via a backplane. In some embodiments, the backplane may include a programmable hardware element, e.g., a Field-Programmable Gate Array (FPGA), which may operate to provide input and output to the PLC from one or more devices included in or coupled to the chassis, e.g., the expansion modules plugged into the expansion slots or other devices coupled to the chassis. Additionally, the backplane may implement any of a variety of buses, including, a VXI (VME eXtensions for Instrumentation) bus, a GPIB (General Purpose Interface Bus) bus, a PXI (PCI extensions for Instrumentation) bus, a serial bus, a parallel bus, or other suitable buses. In some embodiments, where the backplane is a PHE, a user may be able to program the PHE such that the backplane performs operations on the input and output from the PLC and/or the devices coupled to the chassis.

In some embodiments, the PLC may be coupled to several different programmable hardware elements, each communicating with the PLC via the input and output interfaces of the PLC. One or more of the PHEs may be connected to the PLC or chassis via a networked connection and may provide input and output from devices or expansion modules coupled to the PHE. Similar to above, the PHEs may implement one or more of the above listed, or other, suitable protocols for network communication.

Figure 1B:
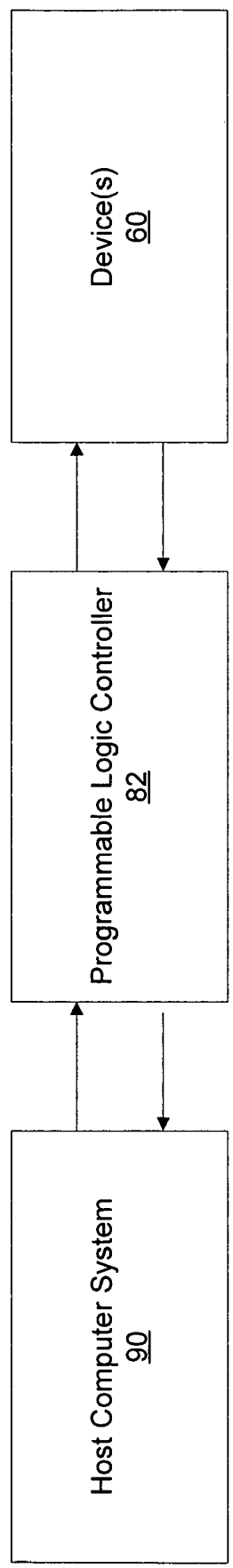
FIG. 1B illustrates a system comprising a programmable logic controller, one or more devices, and a host computer system that may implement one embodiment of the present invention.

FIG. 1B—Programmable Logic Controller Coupled to a Host Computer System

FIG. 1B illustrates a system including the programmable logic controller 82 coupled to the device(s) 60 as well as a host computer system 90. The PLC 82 may be connected through a network or a computer bus, as described above, to the host computer system 90. The computer system 90 may be any of various types, as desired. In some embodiments, a program executing on the computer system 90 may provide a human-machine interface (HMI) for the PLC. For example, the program may be an HMI application executing on the host computer, and facilitating user interaction with the PLC. In this embodiment, the program may receive input from a user on host computer system 90 with regard to instructions for the PLC, which may then provide input to the PLC accordingly.

In one embodiment, a program, e.g., a graphical program, may be downloaded to and executed on the PLC 82. In some embodiments, the program may provide a runtime environment for tasks executing on the PLC. For example, an application development environment with which the program is associated (e.g., the LabVIEW graphical program development environment, provided by National Instruments Corporation) may provide support for downloading a program for execution on the PLC in a real time system.

In further embodiments, the PLC may be a "soft" PLC, i.e., a computer program running on a computer system such as computer system 90 that mimics the operation of a standard PLC. The computer program may be a graphical program, such as a LabVIEW graphical program, and may operate to perform all the functionality of PLCs described herein.

Exemplary Systems

Embodiments of the present invention may apply to control of tasks in a PLC. The present invention may be applicable in systems involved with performing test and/or measurement functions; controlling and/or modeling instrumentation or industrial automation hardware; modeling and simulation functions, e.g., modeling or simulating a device or product being developed or tested; etc.

However, it is noted that the present invention may be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
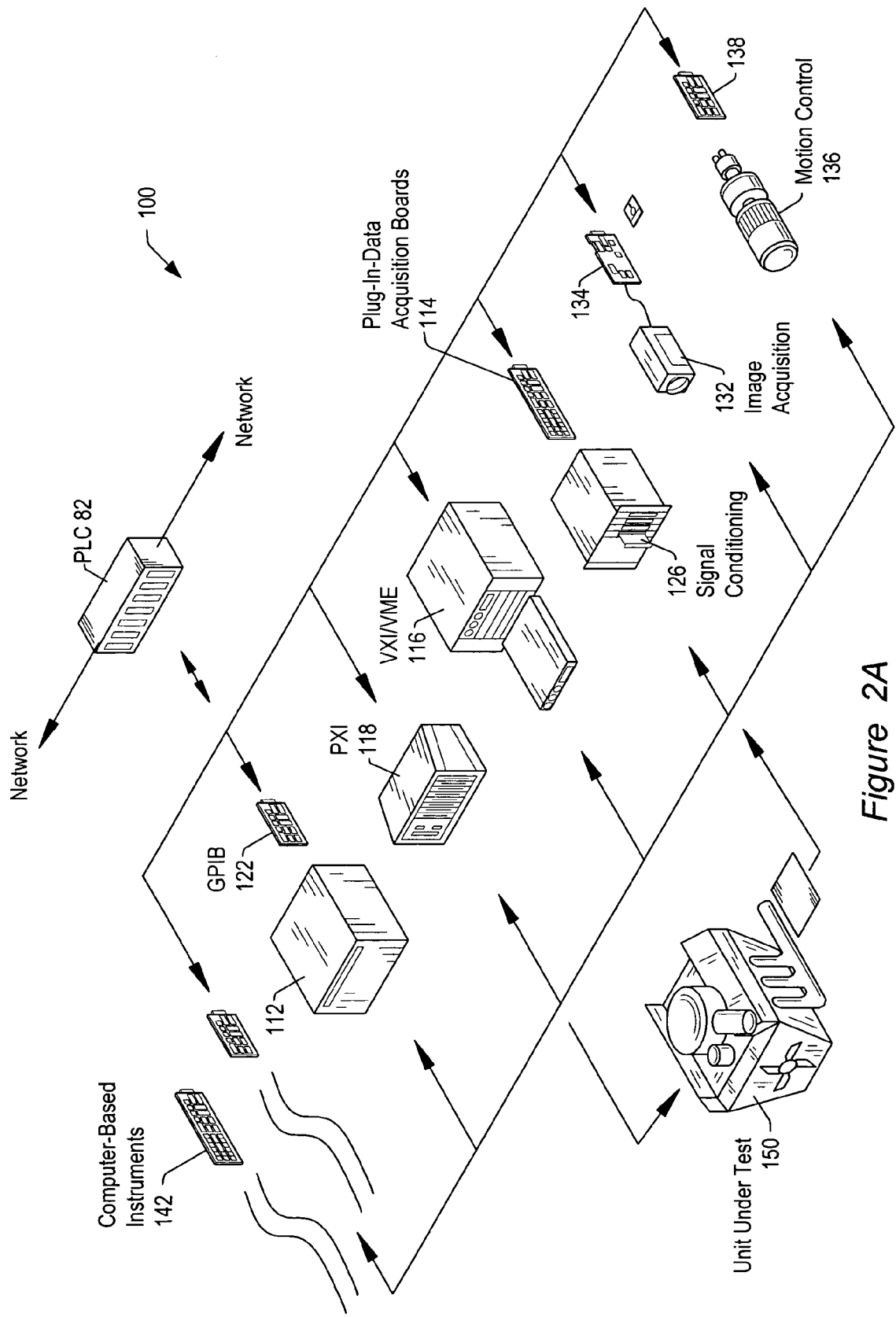
FIG. 2A illustrates an instrumentation control system, according to one embodiment.

FIG. 2A illustrates an exemplary instrumentation control system 100 which may implement embodiments of the invention. The system 100 includes a programmable logic controller 82, which may couple to one or more instruments. As described above, the PLC 82 may include a processor and memory. The PLC 82 may operate with the one or more instruments to analyze, measure or control the unit under test (UUT) or process 150.

The one or more instruments may include a GPIB instrument 112 and associated GPIB interface card 122, a data acquisition board 114 and associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The PLC may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
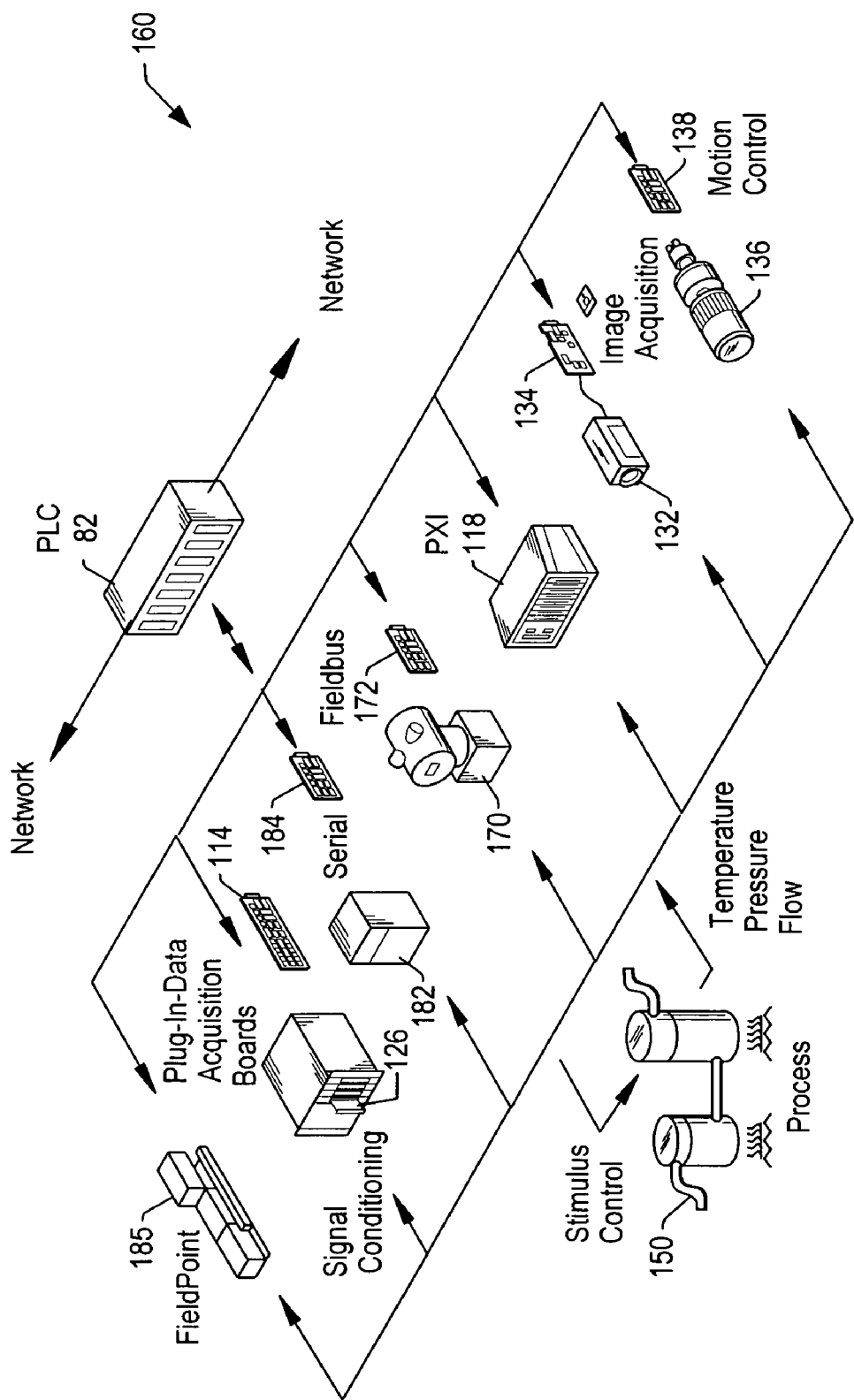
FIG. 2B illustrates an industrial automation system, according to one embodiment.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may include a programmable logic controller 82 which couples to one or more devices or instruments. The PLC 82 may include a processor and memory. The PLC 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 126, a PXI instrument 118, a video device 132 and associated image acquisition card 134, a motion control device 136 and associated motion control interface card 138, a fieldbus device 170 and associated fieldbus interface card 172, a serial instrument 182 and associated serial interface card 184, or a distributed data acquisition system, such as the Fieldpoint system 185 available from National Instruments, among other types of devices.

Figure 3:
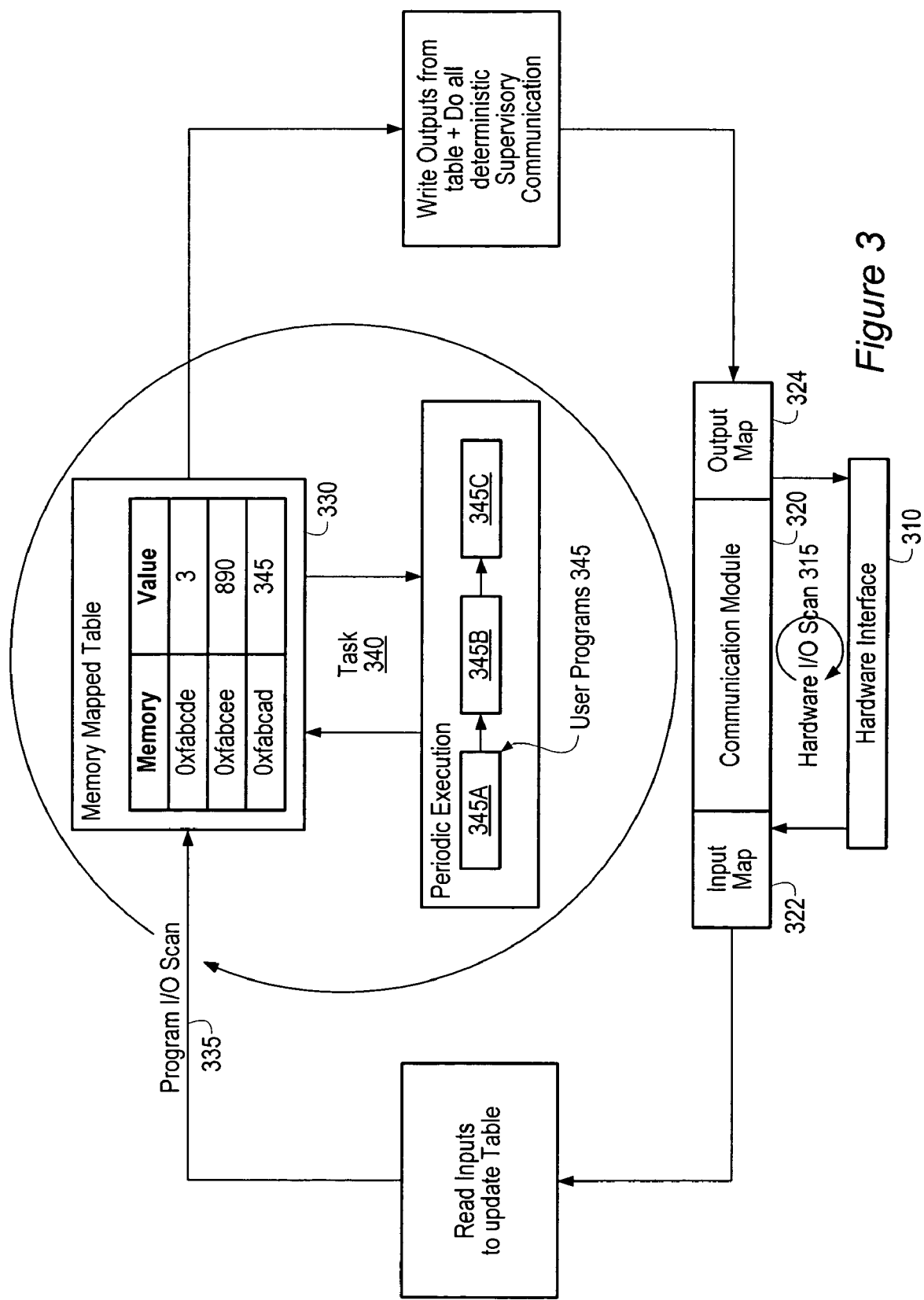
FIG. 3 is a block diagram illustrating the functionality of an exemplary programmable logic controller, according to one embodiment.

FIG. 3—Functionality of an Exemplary Programmable Logic Controller

FIG. 3 is a block diagram illustrating the functionality of an exemplary programmable logic controller according to some embodiments of the present invention. As shown in FIG. 3, various elements may provide functionality of the PLC. For instance, hardware interface 310 may provide communication between the PLC and coupled devices. Additionally, communication module 320 may include an input map 322 and an output map 324 for receiving and storing information from and to the coupled devices (via the hardware interface 310) respectively. The PLC may also include one or more tasks, e.g., task 340, that may execute during PLC operation. Each task may include one or more user programs, e.g., 345A, 345B, and 345C, that may access a memory mapped table 330 for reading and writing data, e.g., for communicating with hardware coupled to or comprised in the PLC. It should be noted that one or more of the user programs may be graphical programs or text-based programs.

During execution, the PLC may utilize a hardware input/output (I/O) scan 315 of the hardware interface 310 to update the input map 322 according to hardware output, and to provide input to the hardware via the output map 324 of the communication module 320. A program I/O scan 335 may read inputs from the input map 322 and write these inputs into memory mapped table 330. The program I/O scan 335 may also write outputs from the memory table 330 into the output map 324. Thus, the I/O maps and memory mapped table may facilitate communications between the tasks (i.e., programs included in the tasks) and hardware coupled to or comprised in the PLC.

One or more tasks may be executing on the PLC, such as task 340. Each task may have an associated frequency of execution, i.e., the number of times the task is executed within a specified amount of time. The frequency of execution may also be measured in length of time between executions, e.g., a task may execute every 10 ms, 100 ms, 504 ms, etc.

Additionally, as noted above, each task may include one or more programs, such as user programs 345, e.g., programs 345A, 345B, and 345C. Each program, as shown, may have a specific respective priority, e.g., the programs may have a specific order of execution each time the task executes. For example, in each task execution cycle, program 345A may execute first, followed by programs 345B and 345C. In some embodiments, the task may execute according to one or more timed loops whose operation may be specified by a program, e.g., a graphical program or a text-based program, included in the PLC, e.g., a timed loop scheduler. In some embodiments, the PLC may have a runtime environment, e.g., LabVIEW runtime, which specifies task execution. The runtime environment may include a controller engine for tasks executing in the PLC, and in embodiments where timed loops are implemented, the timed loop scheduler.

Figure 4:
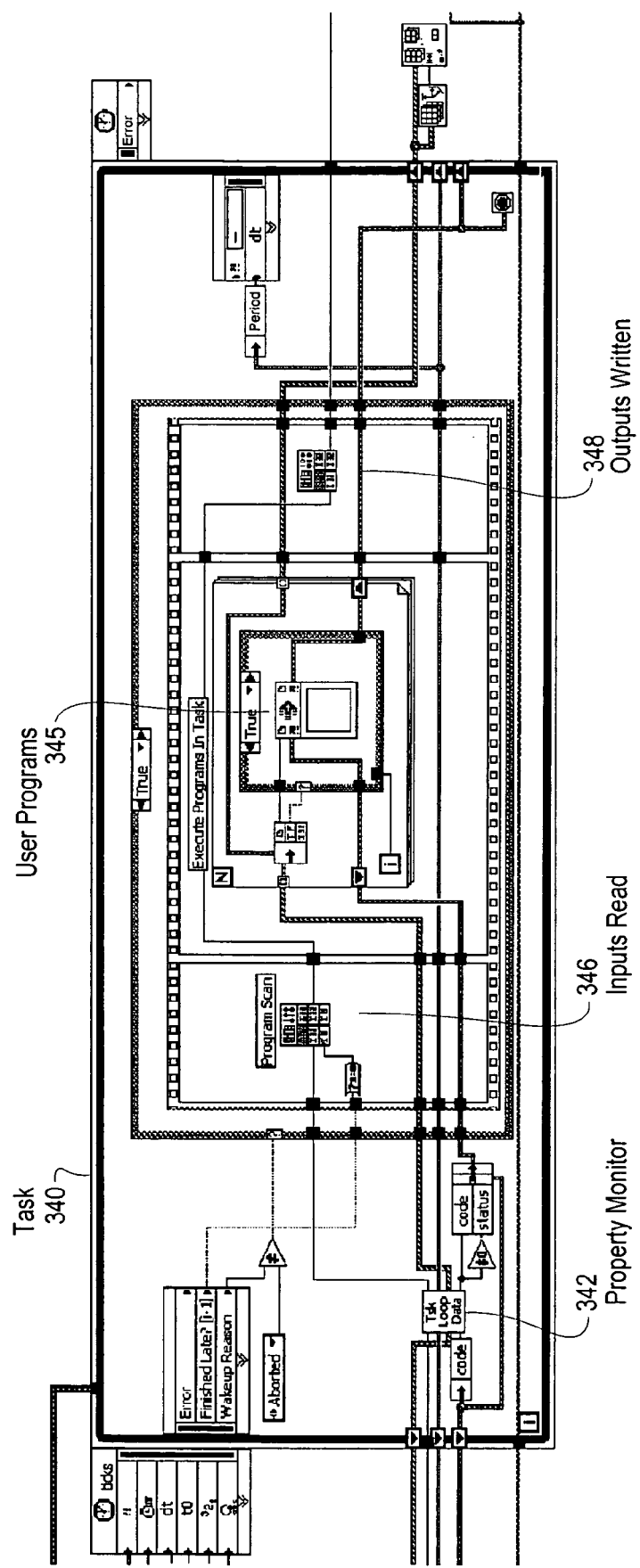
FIG. 4 is an exemplary diagram illustrating a graphical timed loop specifying the operation of a task, according to one embodiment.

FIG. 4 illustrates an exemplary diagram of a graphical timed loop specifying operation of a task, e.g., task 340; according to one embodiment. Before each task execution cycle, the runtime environment, e.g., the timed loop scheduler included in the runtime environment, may determine current properties of the task execution, e.g., frequency of execution, via property monitor 342, and subsequently invoke execution of the task according to the current properties. The inputs may be read, e.g., as in 346 of FIG. 4, from the task memory table prior to execution of the one or more programs, e.g., user programs 345, and subsequently, the programs may be executed according to their order of execution. Following completion of the program execution, outputs may be written, e.g., as in 348 of FIG. 4, to the memory table, and may be subsequently provided as input to hardware via the communication module.

Figure 5:
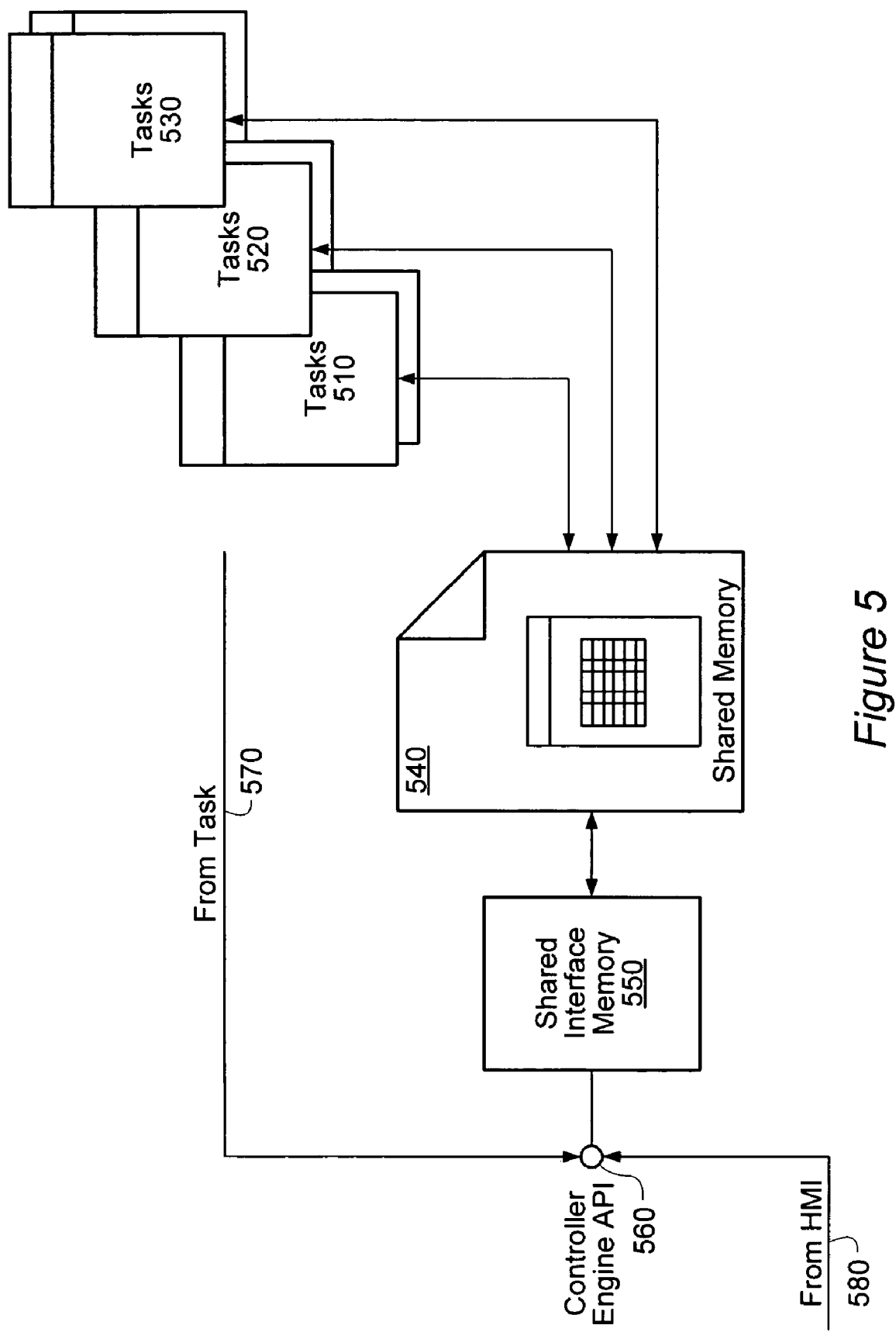
FIG. 5, is an exemplary diagram illustrating a multi-tasking environment, according to one embodiment.

In a multi-tasking environment, as illustrated in FIG. 5, a plurality of tasks, e.g., tasks 510, 520, and 530, may access a shared memory, e.g., shared memory 540. In some embodiments, the shared memory may store property information associated with each of the plurality of tasks. For example, each task may have an associated priority that may be stored in the shared memory, where the priority specifies resource allocation for the task with respect to the other tasks executing on the PLC. As an example regarding priorities of tasks, a first task with a higher priority than that of a second task may be able to interrupt the second task even if the second task is already executing. Said another way, the first task may receive preferential resource allocation over the second task.

Additionally, each task may also have an associated offset with respect to the other tasks or a clock executing on the PLC. For example, in a PLC where three tasks are executing every 10 ms, a first task may execute at a first time, a second task may execute at a second time 2 ms from the first execution time, and the third task may execute at a third later time 4 ms from the first execution time. Thus, the first task has an offset of 0 ms, the second task has an offset of 2 ms, and the third task has an offset of 4 ms.

In some embodiments, as shown in FIG. 5, one of the tasks or an external HMI program may issue a function call, e.g., 570 and 580 respectively, to the runtime environment, in this case, controller engine 560 included in the runtime environment, which may access the shared memory 540 via shared memory interface 550 based on the function call received, discussed in more detail below.

Figure 6:
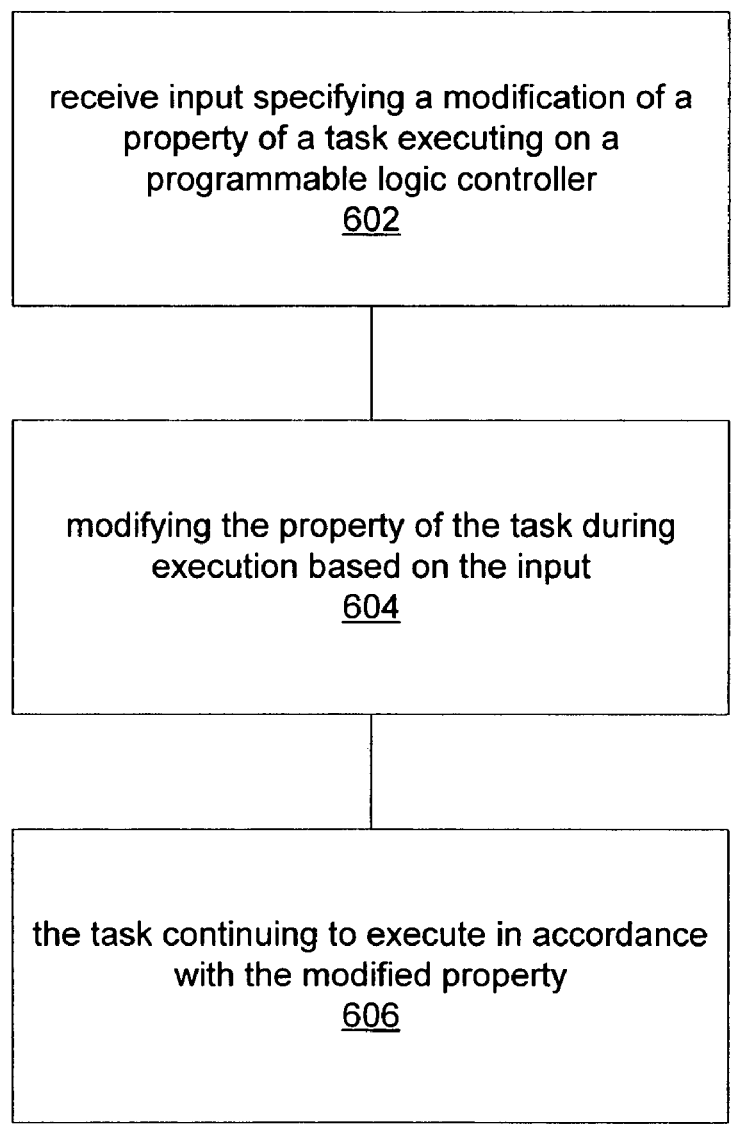
FIG. 6 is a flowchart diagram illustrating one embodiment of a method for modifying properties of a task on an executing programmable logic controller, according to one embodiment.

FIG. 6—Method for Modifying Properties of a Task Executing on a PLC

FIG. 6 illustrates a method for modifying properties of a task on an executing programmable logic controller, according to one embodiment. The method shown in FIG. 6 may be used in conjunction with any of the systems or devices described above. Note that the embodiments described below are directed towards systems comprising one or more tasks executing on a programmable logic controller.

In various embodiments, some of the method elements shown may be performed concurrently, in a different order than shown, or may be omitted. Additional method elements may also be performed as desired. As shown, the method may operate as follows.

In 602, input specifying a modification of a property of a task executing on a programmable logic controller may be received. As indicated above, in some embodiments, the input specifying a modification may be received by the runtime environment executing on the PLC, e.g., the controller engine 560 included in the runtime environment. In some embodiments, the modification may be specified by at least one function call, e.g., an application program interface (API) function call. Additionally, the property of the task may be any of numerous possible properties. For example, the property may include one or more of a frequency of execution of the task, properties of programs executing within the task, or other suitable properties. When the property of the task relates to the one or more programs included in the task, the input may specify a change of priority, i.e., the execution order, of the programs.

In a multi-tasking environment, the property may include the priority of the task, specifying resource allocation for the task with respect to other tasks executing on the PLC. For example, the input may specify modification of a task such that it has a higher priority than the other tasks due to some stimulus change. In this case, upon receiving the higher priority, the task may preferentially execute its programs over programs of other tasks upon entering an execution cycle. Additionally, the property may include the offset of the task. As described above, the offset of the task may specify when the task is executed in relation to the other tasks executing on the PLC, or a clock included in or coupled to the PLC. It should be noted that the property of the task is not limited to those properties described above, and that further properties are envisioned.

Figure 7:
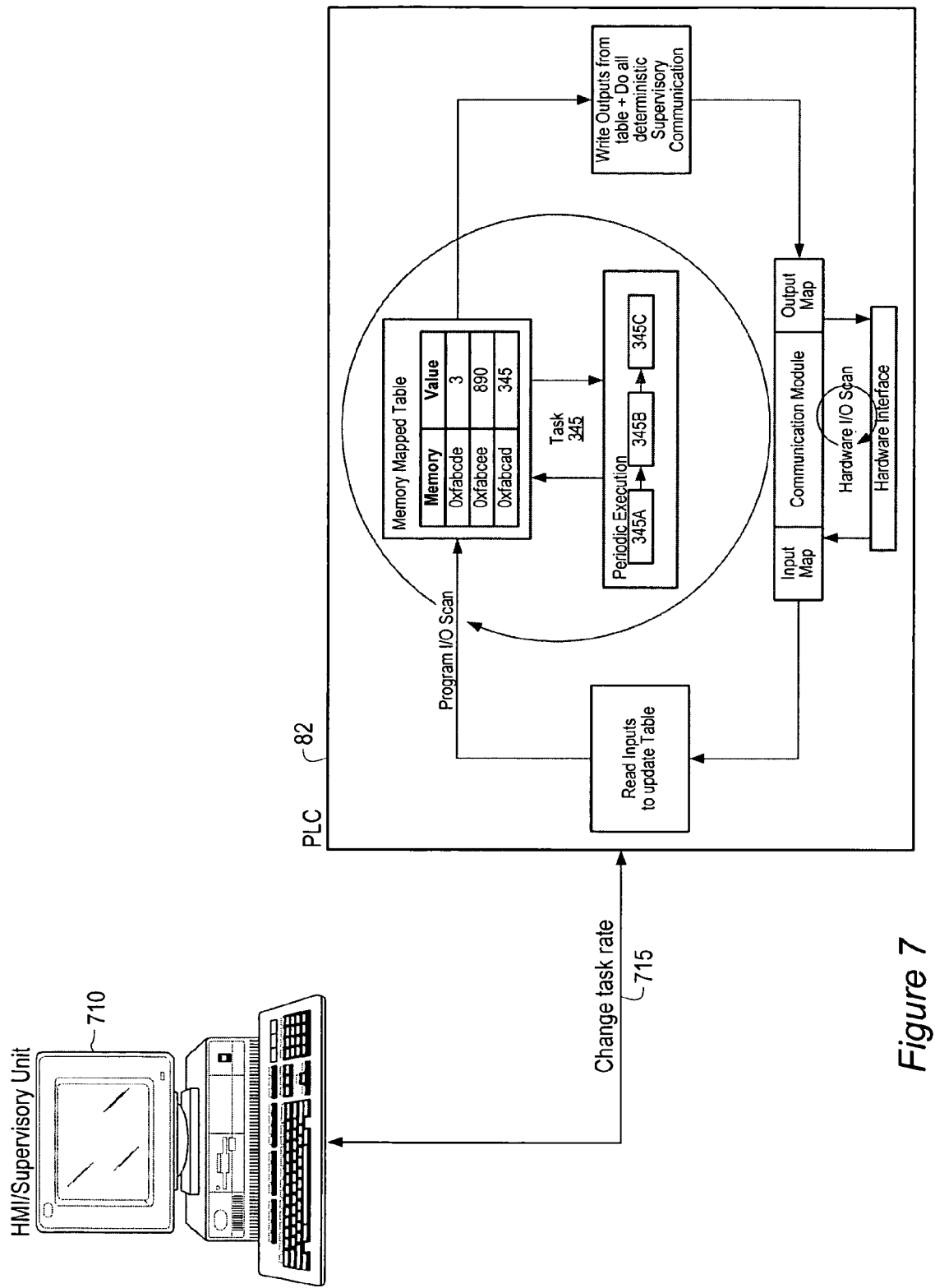
FIG. 7 illustrates an exemplary embodiment of the present invention comprising two tasks executing on a programmable logic controller, according to one embodiment.

In embodiments where the task includes one or more programs executing within each task execution cycle, as illustrated in FIG. 3 (e.g., user program 345A, 345B, and 345C), the input may be received from at least one program of the one or more programs included in the task. In other embodiments, the input may be received from a user. In the example illustrated in FIG. 7, user input may be received to an application program executing on a host computer system coupled to the PLC, e.g., HMI/Supervisory Unit 710. The PLC, e.g., PLC 82, may then receive input from the host computer system based on the user input, in this case, for example, the change task rate command 715.

Figure 8:
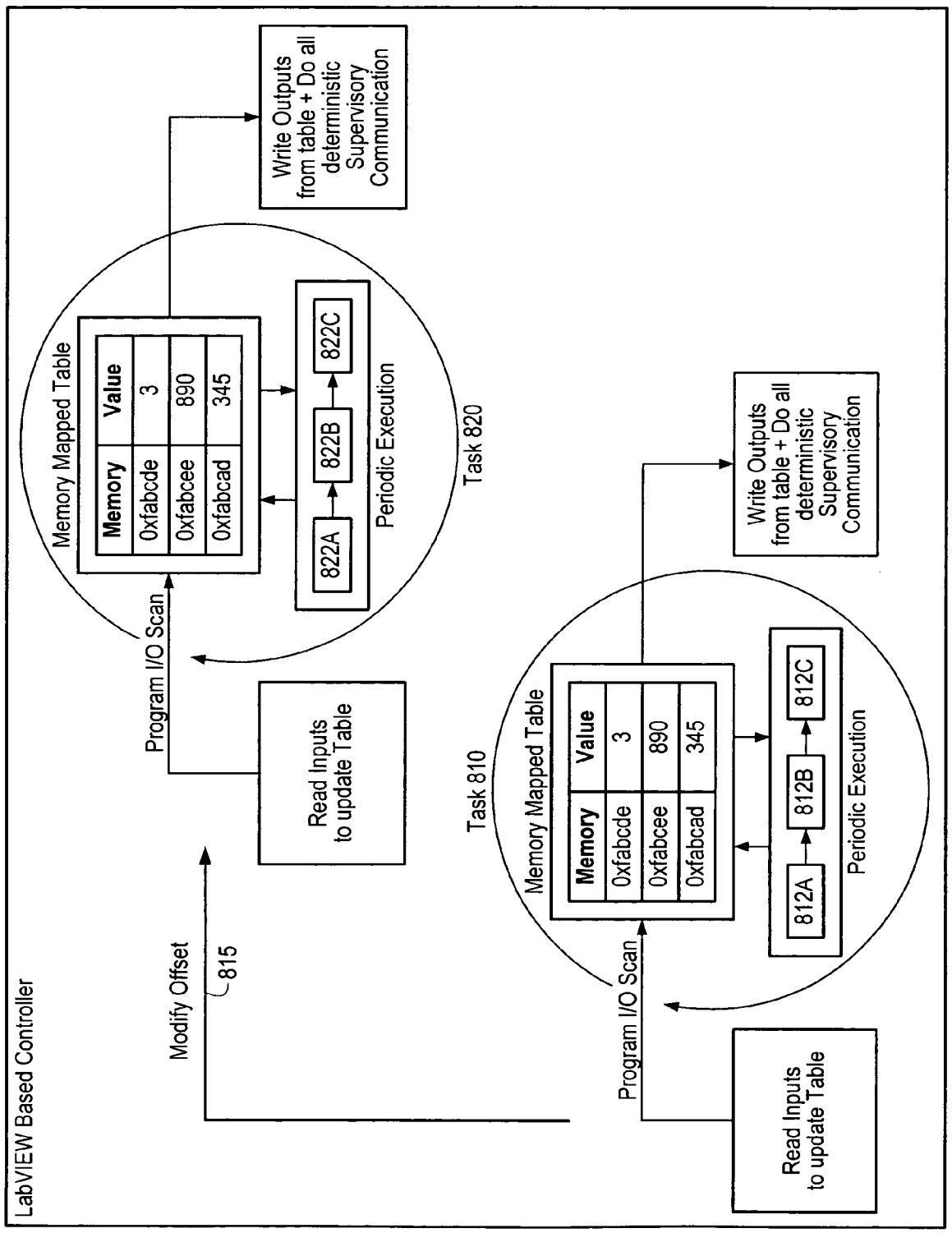
FIG. 8 illustrates an exemplary embodiment of the present invention comprising a host computer and a task executing on a programmable logic controller, according to one embodiment.

Turning now to FIG. 8, as shown, in a multi-tasking environment, the input may be received from another task, i.e., from the other task itself or one or more programs included in the other task, executing on the PLC. For example, task 810, or one or more programs comprised in the task 810, e.g., 812A, 812B, and 812C, may specify a modification of a property of the task 820 (including programs 822A, 822B, 822C), e.g., via a modify offset command 815. In a more specific example where the PLC is used in a process control environment, the PLC may include two tasks. One task, e.g., a "control task", may control a manufacturing line, and the other task, e.g., a "monitoring task", may be a supervisory task, which may monitor the input and output of the manufacturing line and change the operating behavior of the control task. In this example, if the monitoring task detects a decrease in an input, it may specify a modification to slow down the control task by changing the control task's period during execution and in real time, i.e., "on the fly". Using such embodiments, adaptive programs may control the PLC without the necessity of external HMI control.

In 604, the property of the task may be modified while the task is executing based on the received input. In other words, the task executing on the PLC may have a property modified without being halted. For instance, a task may have been originally executing according to a first frequency of execution and the modification may operate to change the first frequency to a second frequency of execution without stopping the task. Similarly, other properties of the task, such as those enumerated above, among others, may be changed without halting the task, and without having to place the PLC in programming mode.

Following the embodiments above where the modification is specified by the at least one function call, the controller engine may receive the functional call and subsequently change one or more task properties as specified by the functional call. In some embodiments, the runtime environment, e.g., the controller engine or timed loop scheduler, may modify task properties, such as those enumerated above, and others, stored in the shared memory via the shared memory interface. Note that the controller engine is not limited to modifying the properties via the shared memory, and may modify the properties via other suitable methods.

In 606, the task may continue to execute in accordance with the modified property. Following the example above, when a task is modified from a first frequency of execution to a second frequency of execution, the modification occurs without halting the task, and subsequently, the task may continue to execute at the new, second frequency.

Thus, various embodiments of the present invention may allow modification of properties of a task "on the fly", i.e., during run-time, without halting the task or placing the programmable logic controller into a programming mode.

Figure 9:
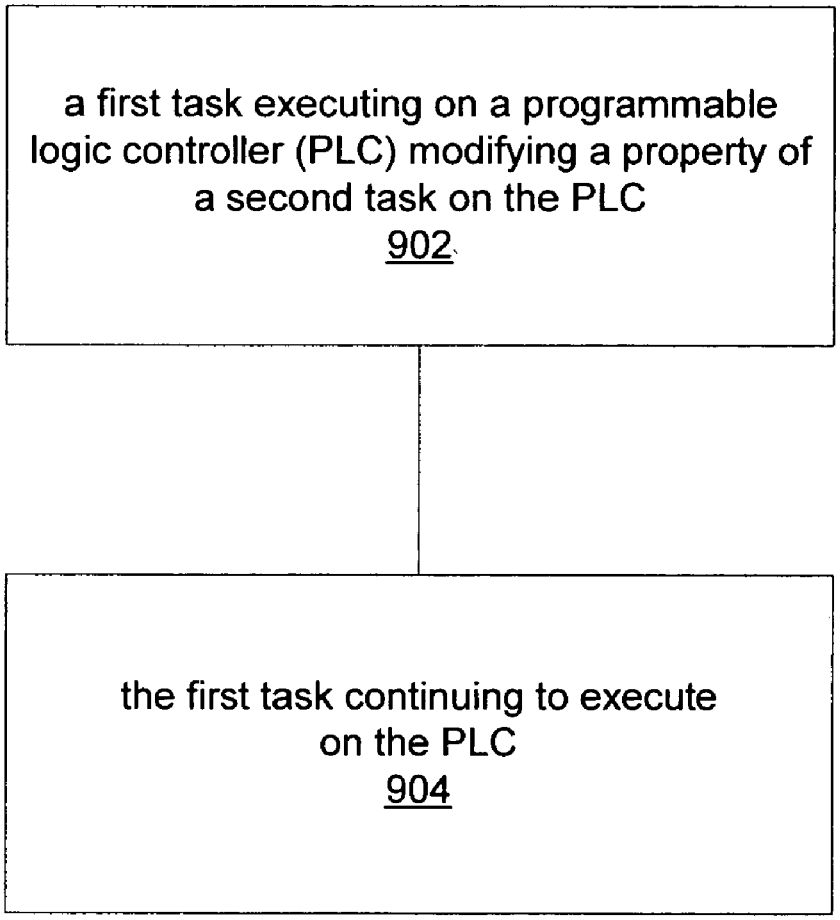
FIG. 9 is a flowchart diagram illustrating one embodiment of a method for modifying properties of a task on a programmable logic controller, according to one embodiment.

FIG. 9—Method for Modifying Properties of a Task on a PLC

FIG. 9 illustrates a method for modifying properties of a task on a programmable logic controller, according to one embodiment. The method shown in FIG. 9 may be used in conjunction with any of the systems or devices described above. Note that the embodiments described below are directed towards systems including a plurality of tasks executing on a programmable logic controller.

In various embodiments, some of the method elements shown may be performed concurrently, in a different order than shown, or may be omitted. Additional method elements may also be performed as desired. As shown, the method may operate as follows.

In 902, a first task executing on a programmable logic controller may modify a property of a second task on the PLC. Similar to the descriptions above, the first task may modify any of a variety of suitable properties, and receive input from a variety of suitable sources. Additionally, if the second task is not executing, the first task may enable the second task, i.e., invoke execution of the second task. Alternatively, if the second task is already executing, the first task may disable the second task.

In 904, the first task may continue to execute on the PLC. Additionally, if the first task did not disable the second task, the second task may also continue to execute with the modified property. Alternatively, if the first task disabled the second task, the second task may have been halted, and not allowed to continue to execute on the PLC.

Thus, various embodiments of the present invention may allow a first task to modify of properties of a second task "on the fly", i.e., during run-time, without halting the second task or placing the programmable logic controller into a programming mode.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A method for modifying properties of tasks on a programmable logic controller, the method comprising:
    a first task executing on a programmable logic controller (PLC) modifying a first property of a second task on the PLC, wherein the first and second task are comprised in a plurality of tasks, wherein the first property comprises a priority of the second task, and wherein the priority specifies resource allocation for the second task with respect to the plurality of tasks; and
    the first task continuing to execute on the PLC.

2. The method of claim 1, further comprising:
    the first task modifying a second property of the second task;
    wherein the second task is not executing on the PLC prior to said modifying the second property, wherein said modifying the second property comprises enabling the second task, and wherein after said modifying the second property, the second task executes on the PLC.

3. The method of claim 1, further comprising:
    the first task modifying a second property of the second task;
    wherein the second task is executing on the PLC, wherein said modifying the second property comprises disabling the second task, and wherein after said modifying the second property, the second task ceases to execute on the PLC.

4. The method of claim 1, further comprising:
    the first task modifying a second property of the second task;
    wherein the second property comprises a frequency of execution of the second task, wherein, prior to said modifying, the second task executes at a first frequency;
    wherein said modifying the second property of the second task comprises changing the frequency of execution of the second task to a second frequency; and
    wherein the second task continues to execute in accordance with the second frequency.

5. The method of claim 1, further comprising:
    the first task modifying a second property of the second task;
    wherein the second task comprises a plurality of programs; and
    wherein said modifying the second property comprises modifying an execution order of the plurality of programs comprised in the second task.

6. The method of claim 1,
    wherein said modifying comprises at least one program comprised in the first task modifying the first property of the second task.

7. The method of claim 1, wherein said modifying further comprises:
    the first task sending a function call specifying the modification of the first property to a runtime environment comprised in the PLC; and
    the runtime environment performing said modification.

8. The method of claim 1,
    wherein the PLC comprises a soft PLC executing on a host computer.

9. The method of claim 1, wherein one or more of the first and second tasks comprise one or more programs, and wherein the one or more programs comprise
    a graphical program, wherein the graphical program comprises a plurality of interconnected nodes that visually indicate functionality of the graphical program.

10. The method of claim 1,
    wherein the plurality of tasks execute in accordance with one or more timed loops.

11. The method of claim 10,
    wherein a runtime environment executing on the PLC manages execution of the one or more timed loops.

12. The method of claim 11, wherein the runtime environment comprises:

a graphical program, wherein the graphical program comprises a plurality of interconnected nodes that visually indicate functionality of the graphical program.

13. The method of claim 11, wherein the runtime environment comprises one or more of:
   a controller engine, wherein the controller engine manages the plurality of tasks; or
   a timed loop scheduler, wherein the timed loops scheduler manages execution of the one or more timed loops.

14. The method of claim 1,
   wherein a runtime environment executing on the PLC manages execution of the plurality of tasks.

15. The method of claim 14, wherein the runtime environment comprises:
   a graphical program, wherein the graphical program comprises a plurality of interconnected nodes that visually indicate functionality of the graphical program.

16. The method of claim 14, wherein the runtime environment comprises one or more of:
   a controller engine, wherein the controller engine manages the one or more tasks; or
   a timed loop scheduler, wherein the task executes in accordance with one or more timed loops, and wherein the timed loops scheduler manages execution of the one or more timed loops.

17. A system for modifying properties of tasks executing on a programmable logic controller, comprising:
   means for a first task executing on a programmable logic controller (PLC) modifying a property of a second task on the PLC, wherein the first and second task are comprised in a plurality of tasks, wherein the property comprises a priority of the task, and wherein the priority specifies resource allocation for the second task with respect to the plurality of tasks; and
   means for the first task continuing to execute on the PLC.

18. An executing programmable logic controller (PLC), comprising:
   a processor;
   a memory medium coupled to the processor, comprising program instructions executable by the processor to implement:
      a first task executing on a programmable logic controller (PLC) modifying a property of a second task on the PLC, wherein the first and second task are comprised in a plurality of tasks, wherein the property comprises a priority of the task, and wherein the priority specifies resource allocation for the second task with respect to the plurality of tasks; and
      the first task continuing to execute on the PLC.

19. A computer-accessible memory medium comprising program instructions, wherein the program instructions are executable by a processor to implement:
   a first task executing on a programmable logic controller (PLC) modifying a first property of a second task on the PLC, wherein the first and second task are comprised in a plurality of tasks, wherein the first property comprises a priority of the task, and wherein the priority specifies resource allocation for the second task with respect to the plurality of tasks; and
   the first task continuing to execute on the PLC.

20. The computer-accessible memory medium of claim 19, wherein the program instructions are further executable to implement:
   the first task modifying a second property of the second task;
   wherein the second task is not executing on the PLC prior to said modifying the second property, wherein said modifying the second property comprises enabling the second task, and wherein after said modifying the second property, the second task executes on the PLC.

21. The computer-accessible memory medium of claim 19, wherein the program instructions are further executable to implement:
   the first task modifying a second property of the second task;
   wherein the second task is executing on the PLC, wherein said modifying the second property comprises disabling the second task, and wherein after said modifying the second property, the second task ceases to execute on the PLC.

22. The computer-accessible memory medium of claim 19, wherein the program instructions are further executable to implement:
   the first task modifying a second property of the second task;
   wherein the second property comprises a frequency of execution of the second task, wherein, prior to said modifying, the second task executes at a first frequency;
   wherein said modifying the second property of the second task comprises changing the frequency of execution of the second task to a second frequency; and
   wherein the second task continues to execute in accordance with the second frequency.

23. The computer-accessible memory medium of claim 19, wherein the program instructions are further executable to implement:
   the first task modifying a second property of the second task;
   wherein the second task comprises a plurality of programs; and
   wherein said modifying the second property comprises modifying an execution order of the plurality of programs comprised in the second task.

24. The computer-accessible memory medium of claim 19, wherein said modifying comprises at least one program comprised in the first task modifying the first property of the second task.

25. The computer-accessible memory medium of claim 19, wherein the PLC comprises a soft PLC executing on a host computer.

26. The computer-accessible memory medium of claim 19, wherein one or more of the first and second tasks comprise one or more programs, and wherein the one or more programs comprise a graphical program, wherein the graphical program comprises a plurality of interconnected nodes that visually indicate functionality of the graphical program.

27. The computer-accessible memory medium of claim 19, wherein the plurality of tasks execute in accordance with one or more timed loops.

28. The computer-accessible memory medium of claim 19, wherein a runtime environment executing on the PLC manages execution of the plurality of tasks, wherein the runtime environment comprises a graphical program, wherein the graphical program comprises a plurality of interconnected nodes that visually indicate functionality of the graphical program.

* * * * *